United States Patent
Reagan et al.

(10) Patent No.: US 7,477,824 B2
(45) Date of Patent: Jan. 13, 2009

(54) UNIVERSAL BRACKET FOR MOUNTING A DROP TERMINAL

(75) Inventors: Randy Reagan, Clinton, MA (US); John Clifton Cobb, III, Fitchburg, MA (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 0 days.

(21) Appl. No.: 11/399,715

(22) Filed: Apr. 5, 2006

(65) Prior Publication Data

US 2007/0237484 A1   Oct. 11, 2007

(51) Int. Cl.
*G02B 6/00* (2006.01)

(52) U.S. Cl. .................. 385/134; 385/135; 385/136; 385/137

(58) Field of Classification Search .......... 385/134–137
See application file for complete search history.

(56) References Cited

U.S. PATENT DOCUMENTS

| | | |
|---|---|---|
| 4,717,231 A | 1/1988 | Dewez et al. |
| 4,805,979 A | 2/1989 | Bossard et al. |
| 5,029,958 A | 7/1991 | Hodge et al. |
| 5,046,811 A | 9/1991 | Jung et al. |
| 5,097,529 A | 3/1992 | Cobb et al. |
| 5,122,069 A | 6/1992 | Brownlie et al. |
| 5,133,038 A | 7/1992 | Zipper |
| 5,231,687 A | 7/1993 | Handley |
| 5,235,665 A | 8/1993 | Marchesi et al. |
| 5,267,122 A | 11/1993 | Glover et al. |
| 5,329,428 A | 7/1994 | Block et al. |
| 5,446,823 A | 8/1995 | Bingham et al. |
| 5,633,973 A | 5/1997 | Vincent et al. |
| 5,659,650 A | 8/1997 | Arnett |
| 5,689,607 A | 11/1997 | Vincent et al. |
| 5,732,180 A | 3/1998 | Kaplan |
| 5,745,633 A | 4/1998 | Giebel et al. |
| 5,754,724 A | 5/1998 | Peterson et al. |
| 5,781,678 A | 7/1998 | Sano et al. |
| 5,804,765 A | 9/1998 | Siemon et al. |
| 5,828,807 A | 10/1998 | Tucker et al. |

(Continued)

FOREIGN PATENT DOCUMENTS

EP    0 511 147 A1    10/1992

(Continued)

OTHER PUBLICATIONS

ADC Telecommunications; "Pole Mount, MST Installation Drawing"; 1 page; (admitted prior art).

(Continued)

*Primary Examiner*—Jennifer Doan
(74) *Attorney, Agent, or Firm*—Merchant & Gould, P.C.

(57) ABSTRACT

The present disclosure relates to a drop terminal mounting system for use in a fiber optic network. The drop terminal mounting system includes a drop terminal having a drop terminal housing to which a plurality of fiber optic adapters are mounted. The fiber optic adapters have exterior ports that are accessible from an exterior of the drop terminal housing. The drop terminal mounting system also includes a bracket having a cradle for receiving the drop terminal. The bracket has features that facilitate mounting the bracket to different types of structures such as poles, strands, or to hand-holes.

21 Claims, 18 Drawing Sheets

U.S. PATENT DOCUMENTS

| | | | |
|---|---|---|---|
| 5,892,870 | A | 4/1999 | Fingler et al. |
| 5,907,653 | A | 5/1999 | Burek et al. |
| 5,917,648 | A | 6/1999 | Harker |
| RE36,592 | E | 2/2000 | Giebel et al. |
| 6,167,183 | A * | 12/2000 | Swain .................. 385/135 |
| 6,208,796 | B1 | 3/2001 | Williams Vigliaturo |
| 6,215,939 | B1 | 4/2001 | Cloud |
| 6,229,948 | B1 | 5/2001 | Blee et al. |
| 6,259,024 | B1 | 7/2001 | Daoud |
| 6,275,639 | B1 | 8/2001 | Bolt et al. |
| 6,275,640 | B1 | 8/2001 | Hunsinger et al. |
| 6,292,614 | B1 | 9/2001 | Smith et al. |
| 6,300,562 | B1 | 10/2001 | Daoud |
| 6,439,779 | B1 | 8/2002 | Hafer |
| 6,453,106 | B1 | 9/2002 | Glaser et al. |
| 6,535,682 | B1 | 3/2003 | Puetz et al. |
| 6,621,975 | B2 | 9/2003 | Laporte et al. |
| 6,721,484 | B1 * | 4/2004 | Blankenship et al. ....... 385/135 |
| 6,760,531 | B1 | 7/2004 | Solheid et al. |
| 6,880,986 | B2 | 4/2005 | Mynatt et al. |
| 6,926,449 | B1 | 8/2005 | Keenum et al. |
| 7,013,074 | B2 | 3/2006 | Battey et al. |
| 7,120,347 | B2 | 10/2006 | Blackwell, Jr. et al. |
| 2003/0077041 | A1 | 4/2003 | Belaidi et al. |
| 2003/0103750 | A1 | 6/2003 | Laporte et al. |
| 2004/0211774 | A1 | 10/2004 | Daoud et al. |
| 2005/0094959 | A1 | 5/2005 | Sibley et al. |
| 2005/0129375 | A1 | 6/2005 | Elkins, II et al. |
| 2005/0145522 | A1 | 7/2005 | Bloodworth et al. |
| 2005/0163448 | A1 | 7/2005 | Blackwell, Jr. et al. |
| 2005/0175308 | A1 | 8/2005 | Elkins, II et al. |
| 2005/0185895 | A1 | 8/2005 | Keenum et al. |
| 2005/0213921 | A1 | 9/2005 | Mertesdorf et al. |
| 2005/0220421 | A1 | 10/2005 | Keenum et al. |
| 2006/0093303 | A1 * | 5/2006 | Reagan et al. .............. 385/135 |
| 2006/0153516 | A1 | 7/2006 | Napiorkowski et al. |
| 2006/0153517 | A1 | 7/2006 | Reagan et al. |

FOREIGN PATENT DOCUMENTS

| | | |
|---|---|---|
| EP | 0 805 536 A1 | 11/1997 |
| EP | 0 844 504 A2 | 5/1998 |
| FR | 2 853 775 A1 | 10/2004 |
| WO | WO 95/07478 | 3/1995 |
| WO | WO 01/50170 A2 | 7/2001 |
| WO | WO 02/06879 A1 | 1/2002 |

OTHER PUBLICATIONS

ADC Telecommunications; "Aerial Mount, MST Installation Drawing"; 1 page; (admitted prior art).

ADC Telecommunications; "OmniReach Multiport Service Terminal Generic Installation Instructions for Carson and Channel Hand-Hole Enclosures"; 3 pages; (admitted prior art).

Exhibits A and B show a drop terminal mounting bracket and a corresponding hanger bracket for hanging the mounting bracket; both the mounting bracket and the hanger bracket were used in public prior to Apr. 5, 2006.

ADC Telecommunications; FL2000 Products; 6 pages; Nov. 1996.

ADC Telecommunications; Fiber Panel Products Second Edition; 16 pages; Jul. 1996.

ADC Telecommunications; Fiber Cable Management Products Third Edition; 22 pages; Jun. 1998.

ADC Telecommunications; Valve-Added Module System; 8 pages; Jun. 1998.

ADC Telecommunications; FL2000™ Wall Mount Box Installation Instructions; 18 pages; ADCP-90-210 Issue 4; Jan. 1998.

ADC Telecommunications; FTUA 4- and 12-Fiber Wall Box User Manual; 14 pages; ADCP-90-249 Issue 2, Mar. 1997.

ADC Telecommunications; Wall Mount Box 12/24/36 Fiber User Manual; 16 pages; ADCP-90-149 Issue 3, Jul. 1997.

ADC Telecommunications; FL1000 Wall-Mount Box Installation and Operation Guide; 28 pages; ADCP-90-334 Issue 1, Nov. 2004.

ADC Telecommunications; FTD1 36-Fiber Wall Box User Manual; 15 pages; ADCP-90-250 Issue 1, Nov. 1996.

ADC Telecommunications; Six-Fiber In-Building Wall Box Installation Instructions; 8 pages; ADCP-90-167 Issue 3, Nov. 1997.

* cited by examiner

UNIVERSAL BRACKET FOR MOUNTING A DROP TERMINAL

TECHNICAL FIELD

The present invention relates generally to fiber optic distribution systems. More particularly, the present invention relates to methods and devices for mounting drop terminals used in fiber distribution systems.

BACKGROUND

Passive optical networks are becoming prevalent in part because service providers want to deliver high bandwidth communication capabilities to customers. Passive optical networks are a desirable choice for delivering high-speed communication data because they may not employ active electronic devices, such as amplifiers and repeaters, between a central office and a subscriber termination. The absence of active electronic devices may decrease network complexity and/or cost and may increase network reliability.

FIG. 1 illustrates a network 100 deploying passive fiber optic lines. As shown in FIG. 1, the network 100 may include a central office 110 that connects a number of end subscribers 115 (also called end users 115 herein) in a network. The central office 110 may additionally connect to a larger network such as the Internet (not shown) and a public switched telephone network (PSTN). The network 100 may also include fiber distribution hubs (FDHs) 130 having one or more optical splitters (e.g., 1-to-8 splitters, 1-to-16 splitters, or 1-to-32 splitters) that generate a number of individual fibers that may lead to the premises of an end user 115. The various lines of the network can be aerial or housed within underground conduits (e.g., see conduit 105).

The portion of network 100 that is closest to central office 110 is generally referred to as the F1 region, where F1 is the "feeder fiber" from the central office. The F1 portion of the network may include a distribution cable having on the order of 12 to 48 fibers; however, alternative implementations may include fewer or more fibers. The portion of network 100 that includes an FDH 130 and a number of end users 115 may be referred to as an F2 portion of network 100. Splitters used in an FDH 130 may accept a feeder cable having a number of fibers and may split those incoming fibers into, for example, 216 to 432 individual distribution fibers that may be associated with a like number of end user locations.

Referring to FIG. 1, the network 100 includes a plurality of breakout locations 125 at which branch cables (e.g., drop cables, stub cables, etc.) are separated out from main cables (e.g., distribution cables). Breakout locations can also be referred to as tap locations or branch locations and branch cables can also be referred to as breakout cables. At a breakout location, fibers of the branch cables are typically spliced to selected fibers of the main cable. However, for certain applications, the interface between the fibers of the main cable and the fibers of the branch cables can be connectorized.

Stub cables are typically branch cables that are routed from breakout locations to intermediate access locations such as a pedestals, drop terminals or hubs. Intermediate access locations can provide connector interfaces located between breakout locations and subscriber locations. A drop cable is a cable that typically forms the last leg to a subscriber location. For example, drop cables are routed from intermediate access locations to subscriber locations. Drop cables can also be routed directly from breakout locations to subscriber locations hereby bypassing any intermediate access locations FIG. 1 shows several branch cables routed to drop terminals 104. Drop terminals can be mounted on a variety of different structures. For example, a typical drop terminal may be mounted to a pole, a strand (e.g., a fiber optic cable or a copper cable) or inside a hand hole. A typical practice in the field for installation of a drop terminal involves mounting the terminal to a mounting structure using fasteners that extend through-holes integrally formed in the housing of the drop terminal. This practice may involve the use of tools such as hammers that can damage the drop terminal. For example, the drop terminal may be cracked thereby providing a location for water intrusion. Also, fiber optics mounted to the terminal may be damaged thereby rendering the terminal inoperative.

It is also common for an installer to use a bracket to mount a drop terminal to a given structure. Typically, separate, specialized brackets are used for each mounting application. For example, a first type of bracket may be used for a pole mount configuration, a second bracket may be used for a strand mount configuration, and multiple other brackets may be used for a hand hole mount. The use of multiple brackets for different mounting configurations is expensive and requires an installer to maintain a relatively large stock of brackets in his or her truck.

SUMMARY

The present disclosure relates to a drop terminal mounting system including a universal bracket adapted to be mounted to a variety of different structures such as a pole, a strand or inside a hand hole. The universal bracket includes a cradle for receiving the drop terminal. In one embodiment, the drop terminal is retained in the cradle by a snap-fit connection. In use, the bracket is initially mounted to the structure to which it is desired to secure the drop terminal. Thereafter, the drop terminal is mounted in the bracket. In this manner, the risks associated with damaging the drop terminal during the mounting process are reduced.

A variety of additional inventive aspects will be set forth in the description that follows. The inventive aspects can relate to individual features and to combinations of features. It is to be understood that both the forgoing general description and the following detailed description are exemplary and explanatory only and are not restrictive of the broad inventive concepts upon which the embodiments disclosed herein are based.

DETAILED DESCRIPTION

Figure 1:
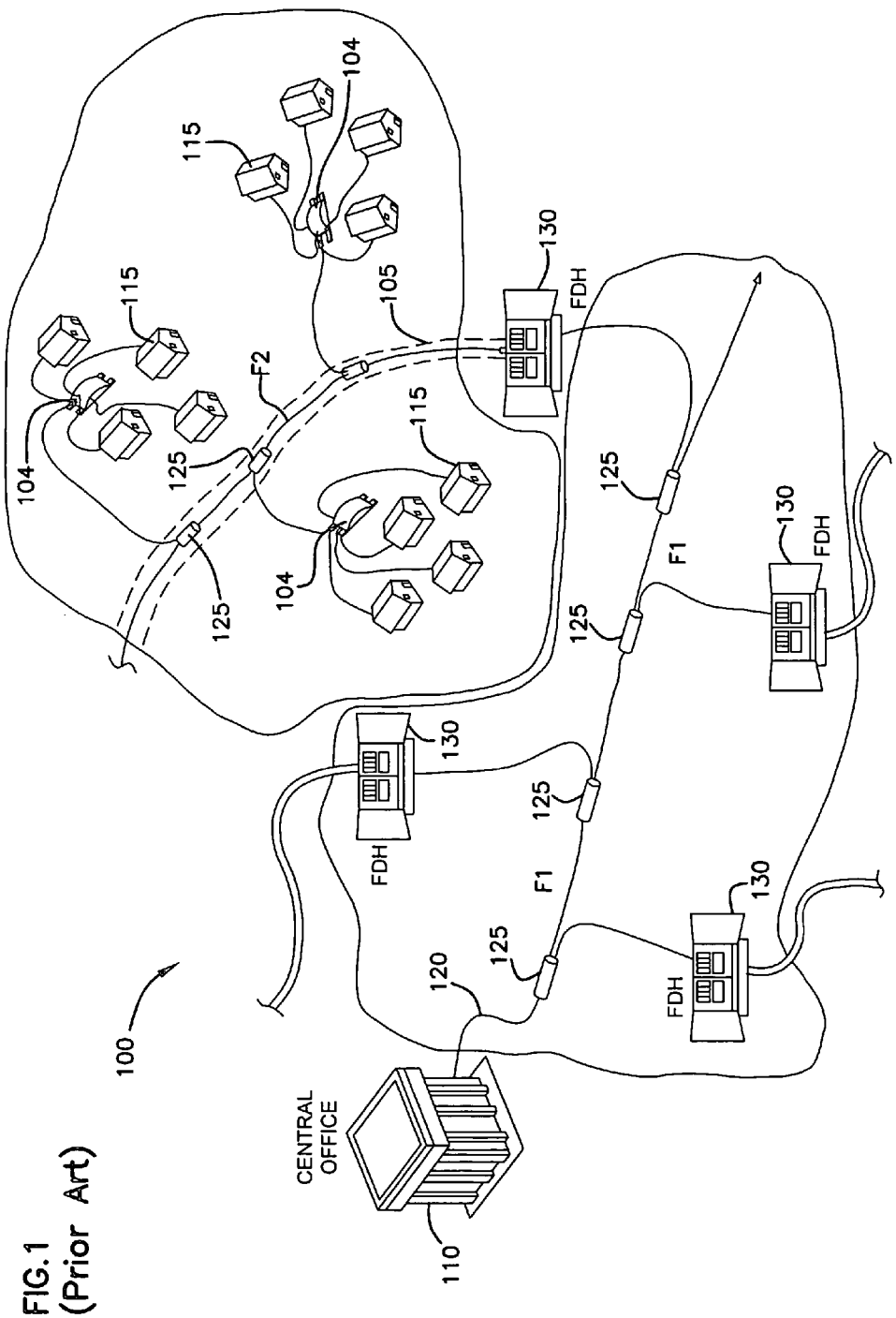
FIG. 1 shows a prior art fiber optic network.
Figure 2:
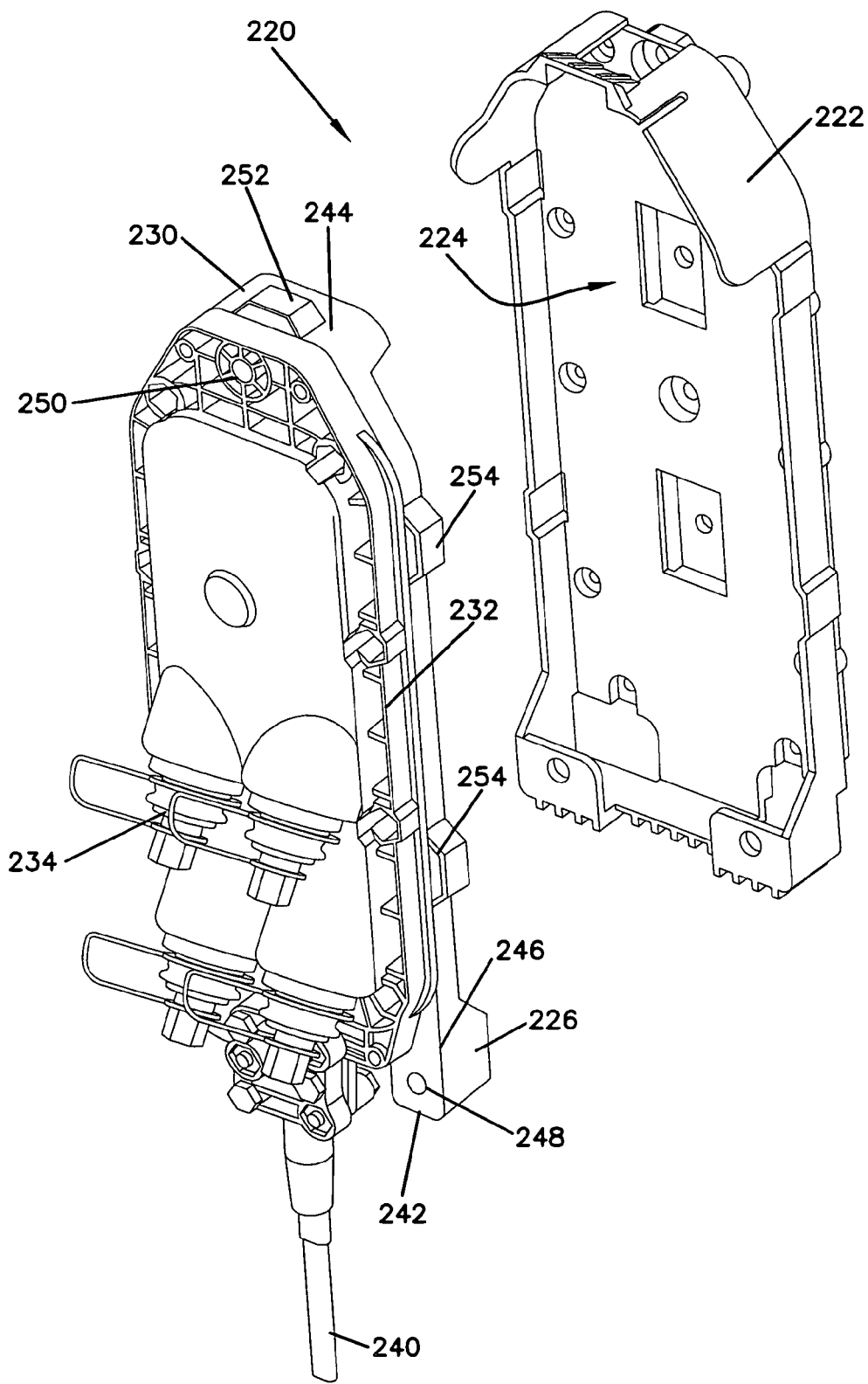
FIG. 2 is an exploded, perspective view of a drop terminal mounting system having features that are examples of inventive aspects in accordance with the principles of the present disclosure, the system includes a universal bracket that receives a drop terminal.
Figure 3:
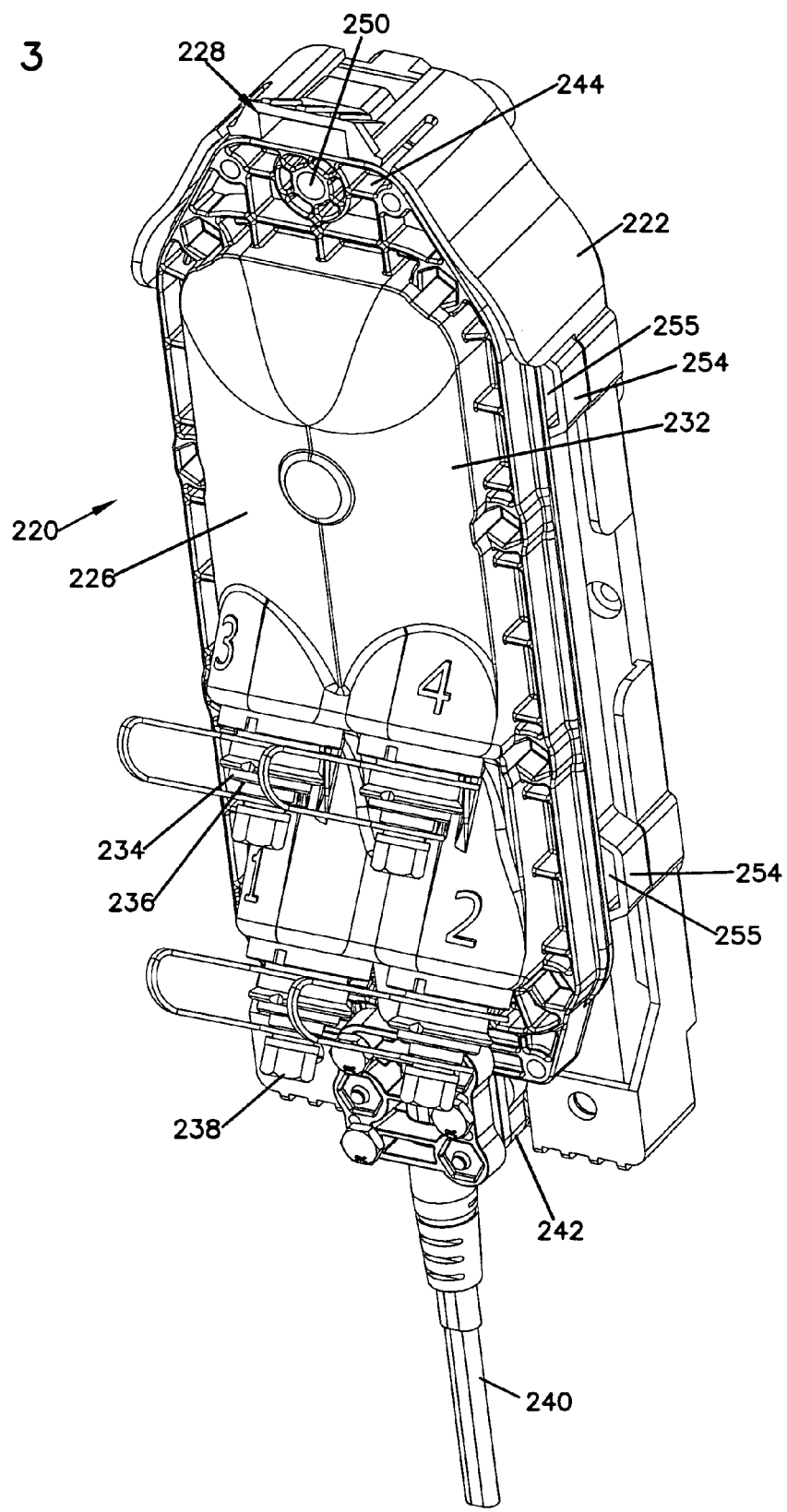
FIG. 3 is a perspective view of the drop terminal mounting system of FIG. 2 with the drop terminal shown mounted within the universal bracket.

FIGS. 2 and 3 illustrate a drop terminal mounting system 220 having features that are examples of inventive aspects in accordance with the principles of the present disclosure. The drop terminal mounting system 220 includes a universal bracket 222 adapted to be connected to a variety of different structures such as poles, strands or hand holes. The universal bracket 222 defines a cradle 224 in which a drop terminal 226 can be secured. The universal bracket 222 includes a flexible latch 228 that retains the drop terminal 226 within the cradle 224 by a snap-fit connection.

In use of the system 220, the universal bracket 222 is initially secured to the structure to which it is desired to mount the drop terminal 226. The universal bracket 222 can typically be connected to the structure by use of fastening elements such as straps, ties or fasteners (e.g., bolts, screws or other fasteners). Once the universal bracket 222 has been secured to the structure, the drop terminal 226 can be snapped within the cradle 224 of the universal bracket 222 such that the universal bracket 222 functions to secure the drop terminal 226 to the structure. This type of mounting configuration reduces the likelihood that the drop terminal 226 will be damaged during the mounting process because fasteners do not need to be passed through the drop terminal 226 itself.

The drop terminal mounting system 220 provides numerous advantages. For example, the universal bracket 222 can be universally mounted to a variety of different structures such as poles, strands or hand holes. This reduces the quantity of materials that need to be ordered and carried by installers on their trucks. The configuration of the universal bracket also is adapted to reduce installation time and minimize the numbers of fasteners needed to secure the system to a given structure. The system is further adapted to be easily secured to structures using conventional types of fasteners (e.g., screws, straps, ties) that an installer has readily available on his or her truck. The universal bracket 222 is also compatible with existing legacy brackets that installers may encounter already installed in the field. Moreover, the bracket 222 can be mounted on the drop terminal 226 during shipping to minimize wasted space.

Referring to FIGS. 2 and 3, the drop terminal 226 includes a housing 229 having a base 230 and a cover 232. A plurality of adapters 234 are mounted to the cover 232. The adapters 234 include exterior ports 236 that are accessible from the outside of the housing 229. The adapters 234 also include interior ports that are accessible from inside the housing 229. The exterior ports 236 are enclosed by plugs 238 when not connected to drop lines. The interior ports receive connectors corresponding to the fibers of a tether 240 (e.g., a branch cable) that is routed into the interior of the housing 229. Further details about the drop terminal 226 can be found in application Ser. No. 11/075,847, that was filed on Mar. 8, 2005, and is hereby incorporated by reference in its entirety.

Referring still to FIG. 2, the housing 229 includes a first end 242 positioned opposite from a second end 244. The tether 240 enters the housing 229 of the drop terminal 226 through the first end 242. Enlarged ears 246 are also provided at the first end 242. The enlarged ears 246 define through-holes 248 adapted for receiving fasteners such as screws or bolts.

An additional through-hole 250 is provided adjacent the second end 244. The through-hole 250 is also adapted for receiving a fastener. The housing 229 further includes an end ear 252 and two pairs of side ears 254. The ears 252, 254 are positioned about the periphery of the housing 229 and define through-slots 255 adapted for receiving securing elements such as straps or ties.

Referring to FIGS. 4-8, the universal bracket 222 is depicted as having a one-piece plastic construction. The bracket 222 includes a base portion 260 having a front side 262 (see FIGS. 4 and 6) and a back side 264 (see FIG. 7). The base portion 260 is elongated along a length L that extends between a first end 266 and a second end 268. The base portion 260 also includes side edges 270, 272 that extend along the length L between the first and second ends 266, 268.

Figure 6:
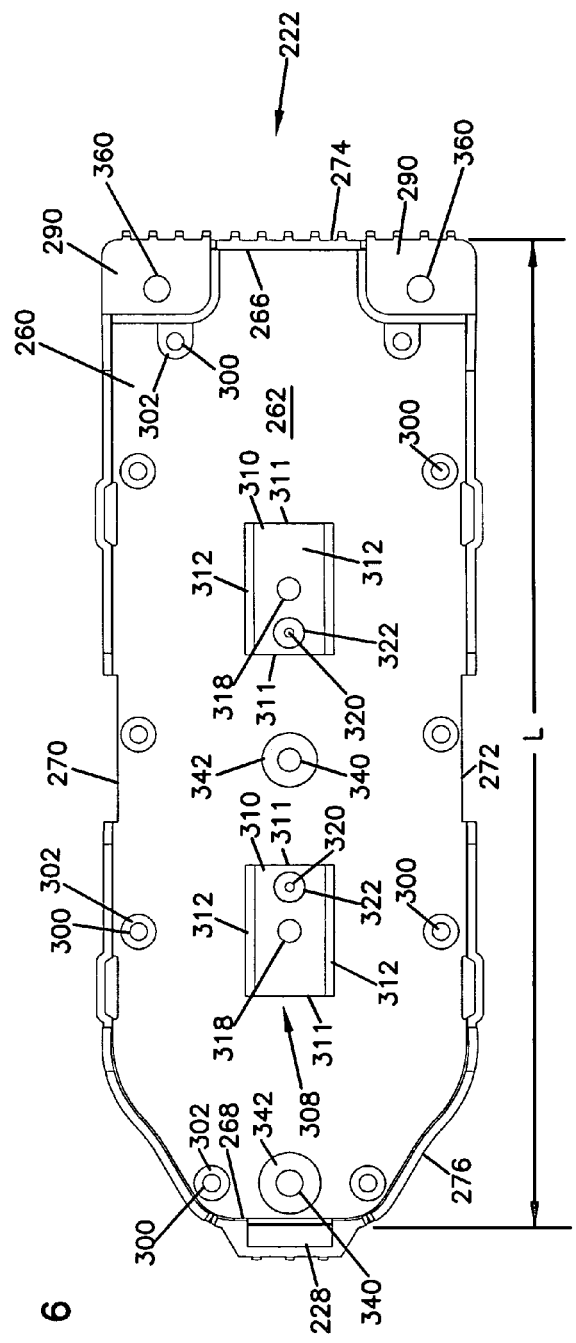
FIG. 6 is a front view of the universal bracket of FIG. 4.
Figure 8:
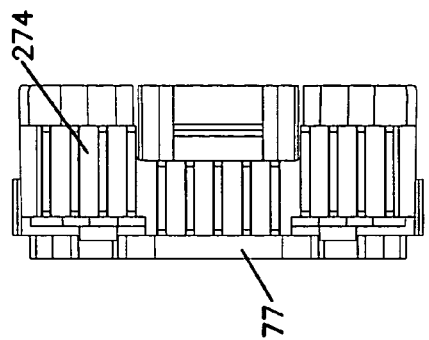
FIG. 8 is an end view of the universal bracket of FIG. 4.
Figure 7:
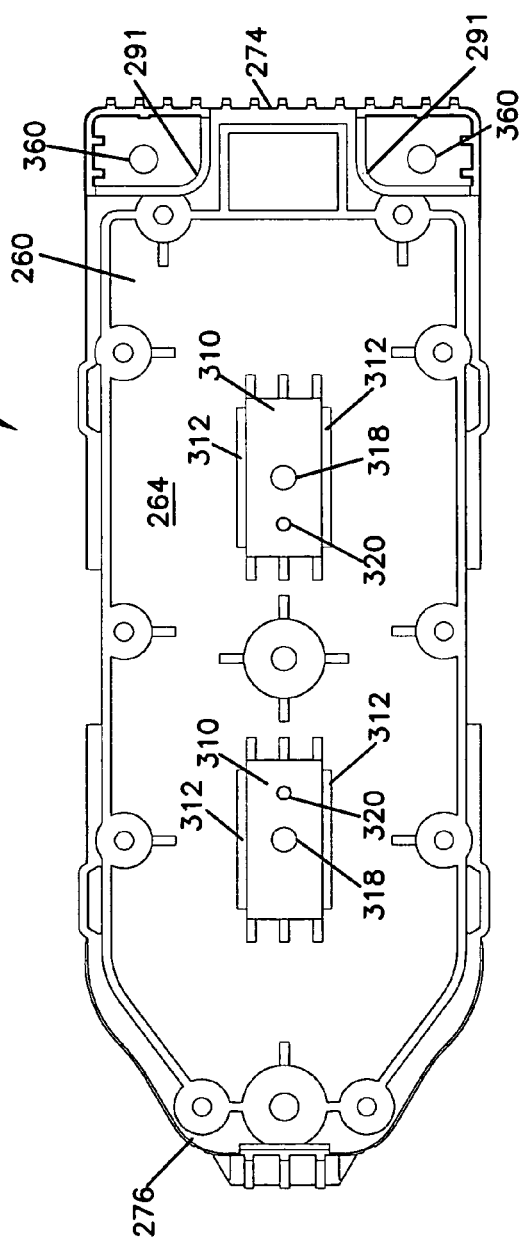
FIG. 7 is a back view of the universal bracket of FIG. 4.
Figure 15:
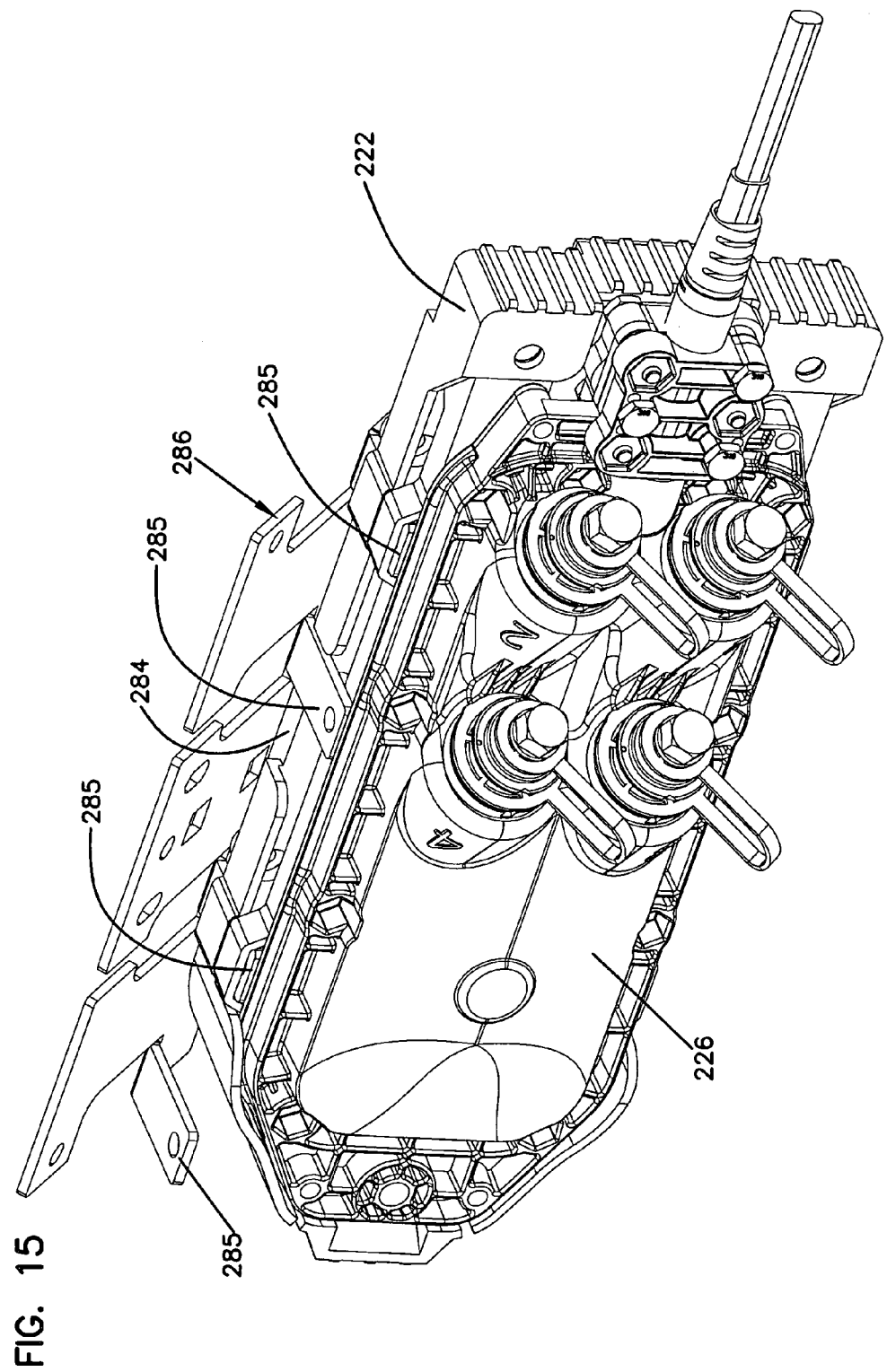
FIG. 15 shows the drop terminal mounting system of FIGS. 2 and 3 with the universal bracket secured to a conventional hanger bracket.

The universal bracket 222 includes structure defining the cradle 224. For example, the bracket 222 includes a first end wall 274 and a second end wall 276. The first end wall 274 projects outwardly from the front side 262 of the base portion 260 adjacent the first end 266 of the base portion 260. The second end wall 276 projects outwardly from the front side 262 of the base portion 260 adjacent the second end 268 of the base portion 260. The bracket 222 further includes side walls 278, 280 that respectively extend along the side edges 270, 272 of the base portion 260, and project outwardly from the front side 262 of the base portion 260. As shown best at FIG. 5, the side walls 278, 280 have heights that are less than the heights of the end walls 274, 276. As shown at FIG. 8, central breaks or gaps 282, 284 are provided in the side walls 278, 280. The gaps 282 provide clearance for allowing the drop terminal 226 to be easily grasped if it is desired to remove the drop terminal 226 from the cradle 224. The gaps 282, 284 are also notched inwardly as shown at FIG. 6 to provide clearance for receiving elements of a legacy bracket such as selected fingers 285 of a hanger bracket 286 (see FIG. 15).

The end walls 274, 276 and the side walls 278, 280 cooperate to define a wall structure of the cradle 224 that is sized and shaped to receive the drop terminal 226. In the depicted embodiments, the end walls 274, 276 and the side walls 278, 280 cooperate to extend around a majority of the periphery of the drop terminal 226. The first end wall 274 includes a notched region 277 that provides clearance for receiving the tether 240 of the drop terminal 226.

Figure 4:
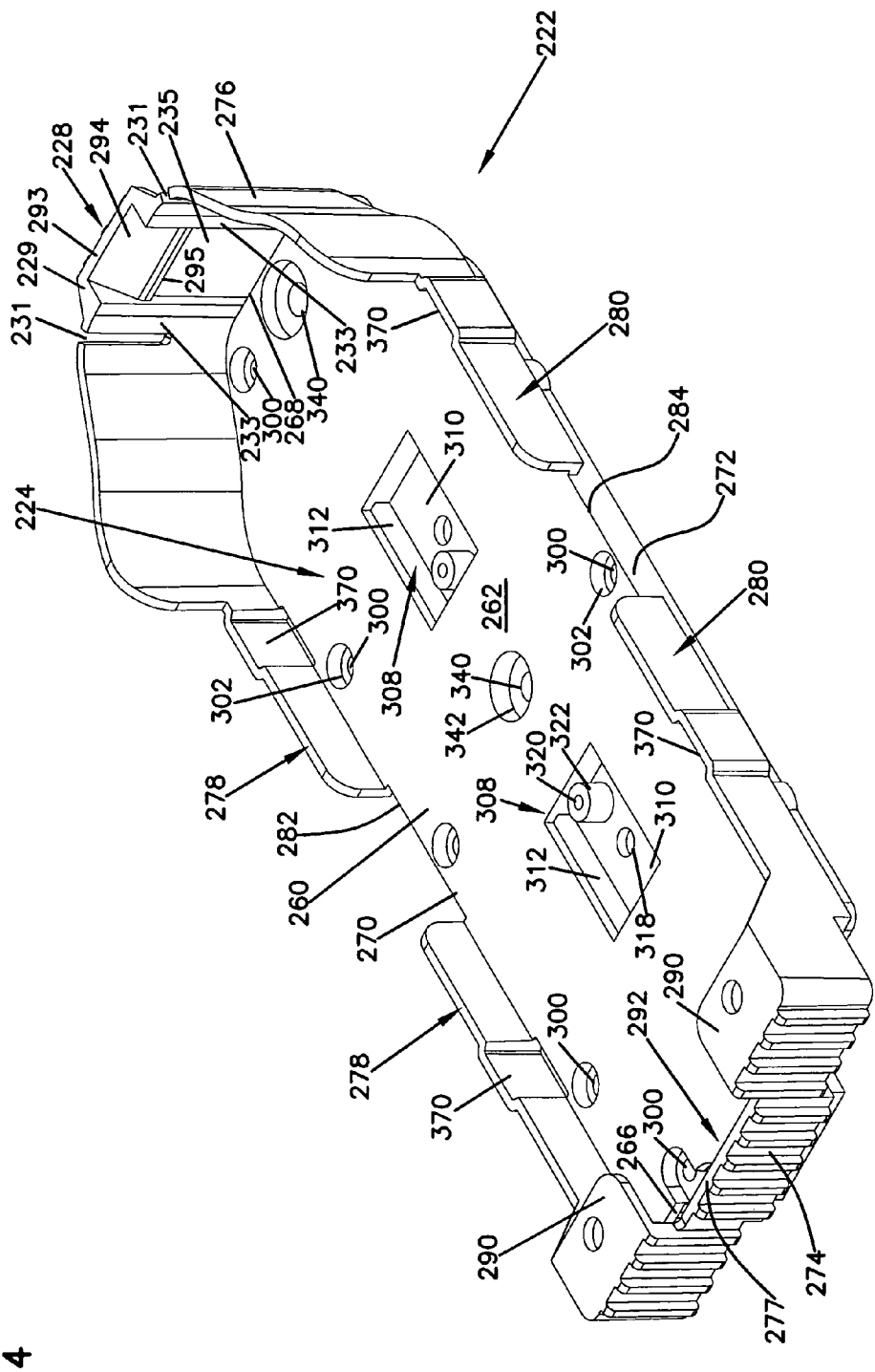
FIG. 4 is a perspective view of the universal bracket used in the system of FIG. 2.
Figure 5:
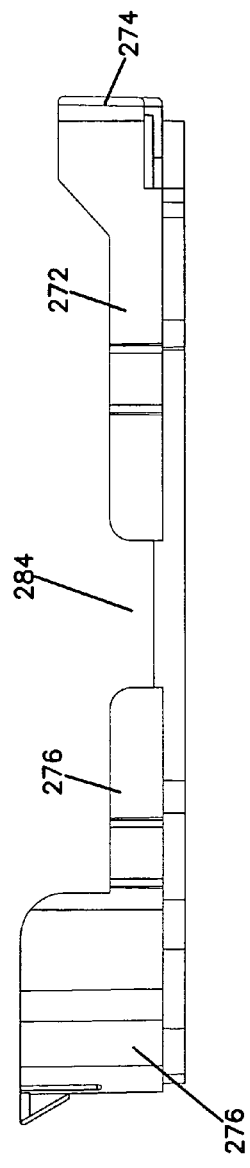
FIG. 5 is a side view of the universal bracket of FIG. 4.

The universal bracket 222 further includes structure for securing/retaining the drop terminal 226 within the cradle 224. For example, the bracket 222 includes retention tabs 290 that cooperate with the first end wall 274 to define a pocket 292 adapted to receive the first end 242 of the drop terminal 226. Additionally, the flexible latch 228 of the bracket 222 is mounted at the second end 268 of the base portion 260. The latch 228 includes a flexible latch member 229 provided between two upright slots 231 defined in the wall 276. The latch member 229 has a cantilevered configuration with two base ends 233 that are integral with the wall 276, and a free end 293. The base ends 233 are separated from one another by an opening 235 in the wall 276. A ramp surface 294 is positioned adjacent the free end 293 of the latch member 229, and a retention shoulder 295 is positioned adjacent the ramp surface 294. As shown at FIG. 4, the opening 235 is positioned directly beneath the retention shoulder 295.

To mount the drop terminal 226 in the cradle 224, the first end 242 of the drop terminal housing 229 is inserted into the pocket 292, and then the drop terminal 226 is pivoted toward the universal bracket 222. As the drop terminal 226 is pivoted toward the universal bracket 222, the end ear 252 of the housing 229 engages the ramp surface 294 of the latch 228 causing the latch to flex outwardly. The latch 228 continues to flex outwardly until the end ear 252 passes the retention shoulder 295 of the latch 228. When the end ear 252 passes by the retention shoulder 295 of the latch 228, the latch 228 snaps back to a locking position in which the retention shoulder 295 overlaps the end ear 252 to lock the drop terminal 226 in place. Once mounted within the cradle 224, the retention shoulder of the latch 228 and the retention tabs 290 of the pocket 292 prevent the drop terminal 226 from being unintentionally disconnected from the universal bracket 222.

To remove the drop terminal 226 from the universal bracket 222, the latch 228 can be manually flexed outwardly to a release position, and the drop terminal 226 can be grasped adjacent to the gaps 282, 284. Thereafter, with the latch 228 in the release position, the drop terminal 226 can be pivoted away from the universal bracket 222 and then slid out of the pocket 292.

Figure 16:
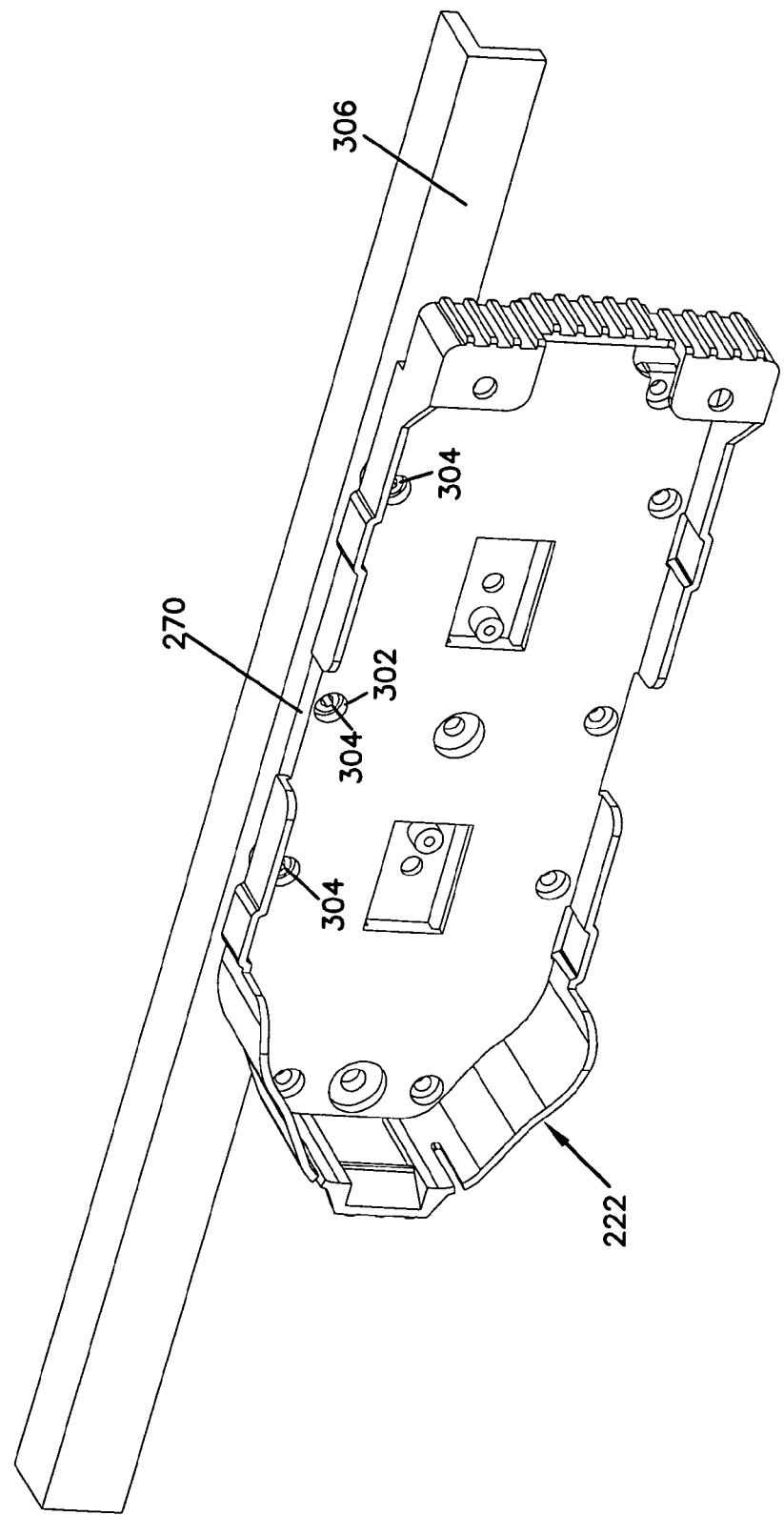
FIG. 16 shows the universal bracket of the system of FIGS. 2 and 3 secured to the lip of a hand hole.
Figure 17:
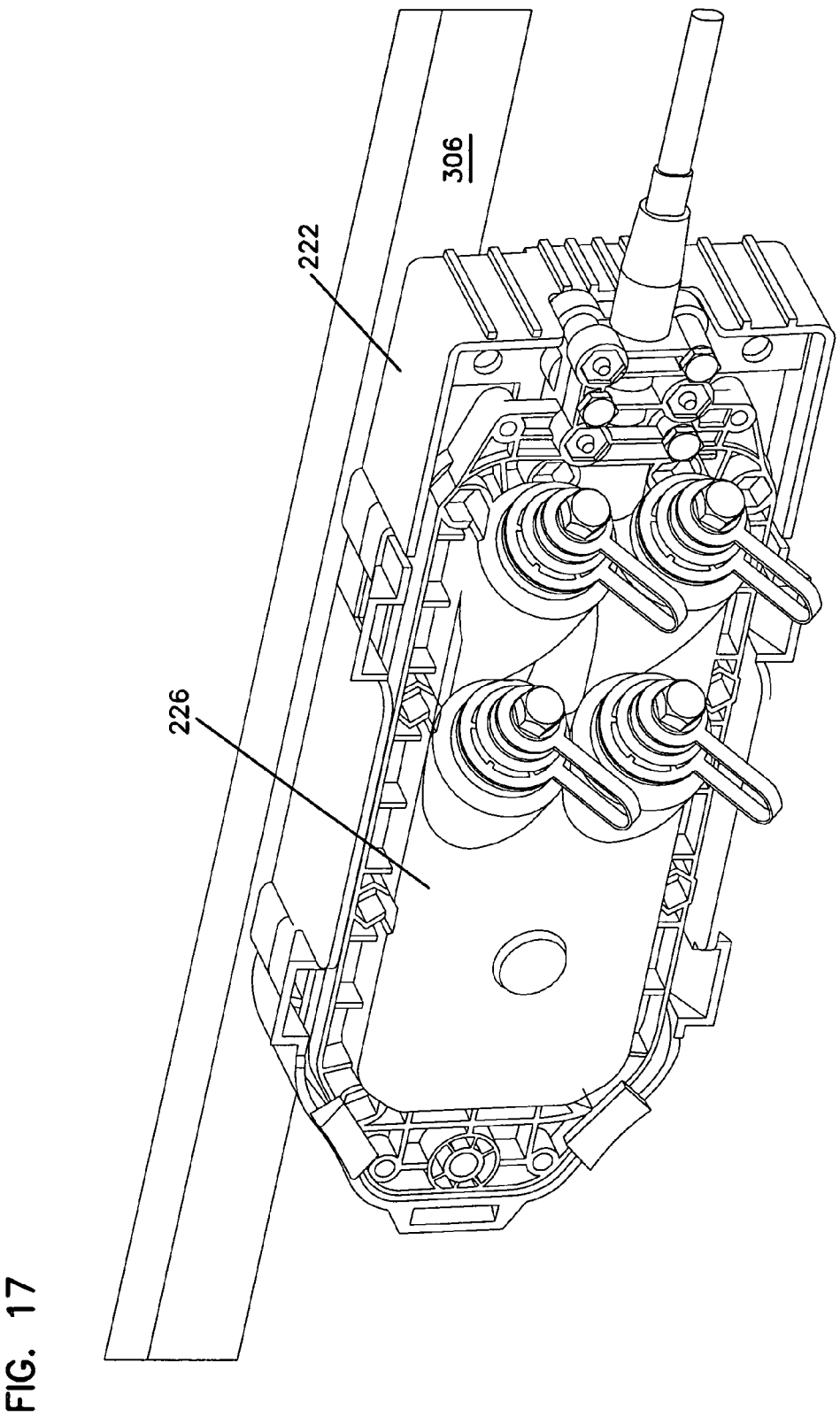
FIG. 17 shows the drop terminal secured within the universal bracket fastened to the lip of the hand hole.

The universal bracket 222 additionally includes features for facilitating mounting the universal bracket 222 to a variety of different types of structures such as poles, hand holes and strands. For example, the base portion 260 defines a plurality of through-holes 300 that extend through the base portion 260 from the front side 262 to the back side 264. Countersunk shoulders or recesses 302 are provided at the front side 262 around the through-holes 300 to provide clearance for receiving structures such as bolt or screw heads. The through-holes 300 are generally positioned around the periphery of the base portion 260. For example, three through-holes 300 are shown provided along each of the side edges 270, 272, two through-holes 300 are provided adjacent the first end 266, and an additional two through-holes 300 are provided adjacent the second end 268. The through-holes 300 are adapted to receive fasteners (e.g., screws or bolts) that are used to secure the universal bracket 222 to a structure such as the lip of a hand hole. For example, FIGS. 16 and 17 show three screws 304 being used to mount the universal bracket 222 to a hand hole lip 306. The screws 304 have been inserted through three of the through-holes 300 located along the side edge 270 of the universal bracket 222. Heads of the screws are recessed within the recesses 302 surrounding the three through-holes 300.

Figure 11:
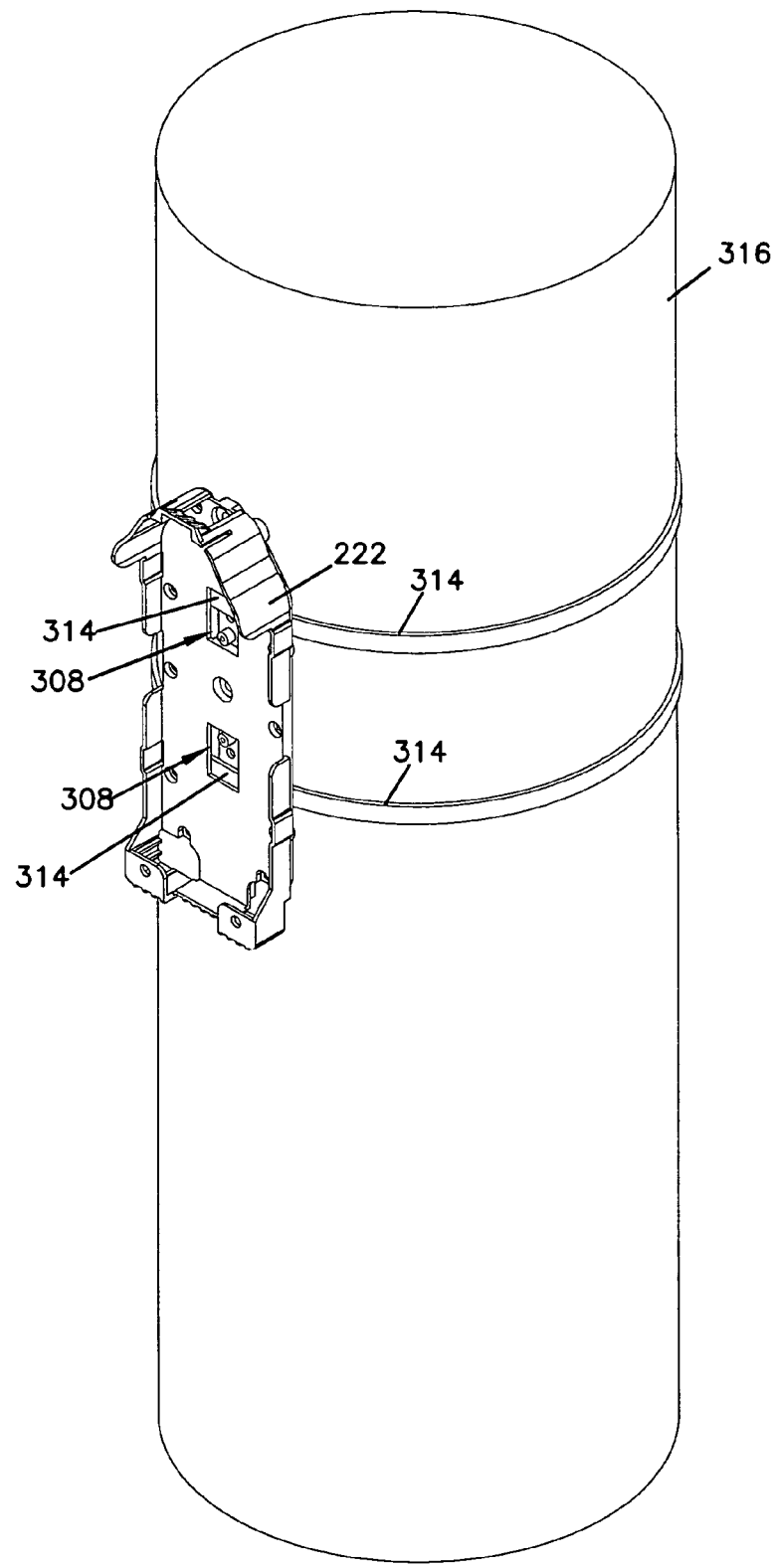
FIG. 11 shows another mounting configuration for securing the universal bracket of the system of FIGS. 2 and 3 to a post.
Figure 12:
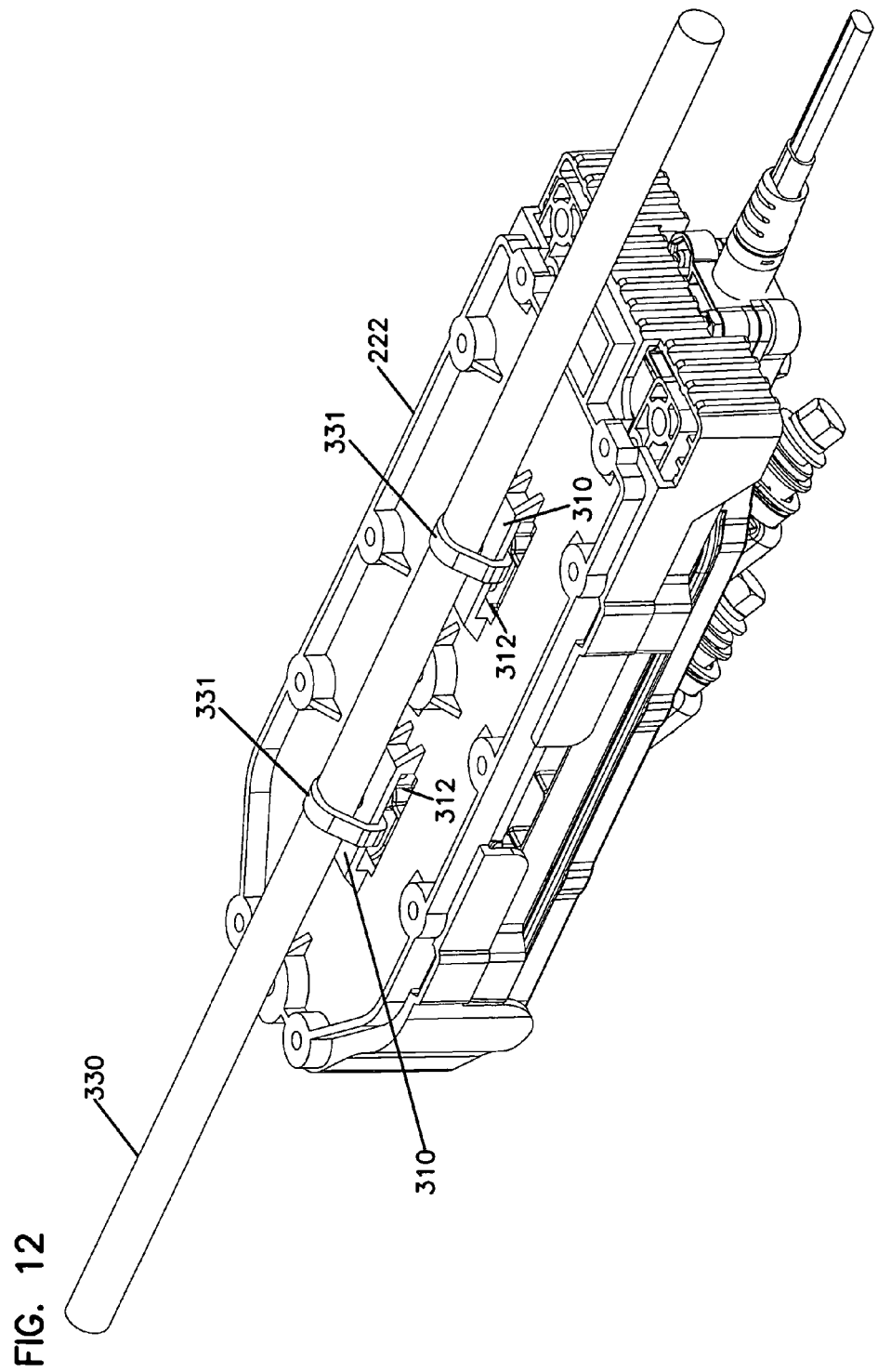
FIG. 12 shows the universal bracket of the system of FIGS. 2 and 3 secured to a strand such as a fiber optic cable or a copper cable.

The universal bracket 222 also includes two strap receivers 308. The strap receivers 308 are aligned generally along a center line of the universal bracket 222. As shown at FIG. 4, the strap receivers 308 each include a strap-receiving member 310 that is recessed relative to the front side 262 of the base portion 260. The strap-receiving members 310 (e.g., loops) define slots 312 for receiving straps. The strap-receiving members 310 have ends 311 that are integrally formed with the base portion 260. In use, the strap receivers 308 allow straps to readily be used to fasten the universal bracket 222 to a structure such as a pole or strand. For example, FIG. 11 shows two straps 314 being used to secure the universal bracket 222 to a pole 316. The straps 314 are routed around the pole and are also routed through the slots 312 of the strap receivers 308. When the straps 314 are routed through the slots 312, the strap-receiving members 310 are captured between the straps 314 and the pole 316. In this way, the universal bracket 222 is securely attached to the pole 316. As shown at FIG. 12, the strap receivers 308 can also be used to facilitate securing the universal bracket 222 to a strand 330 (e.g., a fiber optic cable or copper cable). As shown at FIG. 12, ties 331 are routed through the slots 312 and around the strand 330 to secure the universal bracket 222 to the strand 330.

Figure 9:
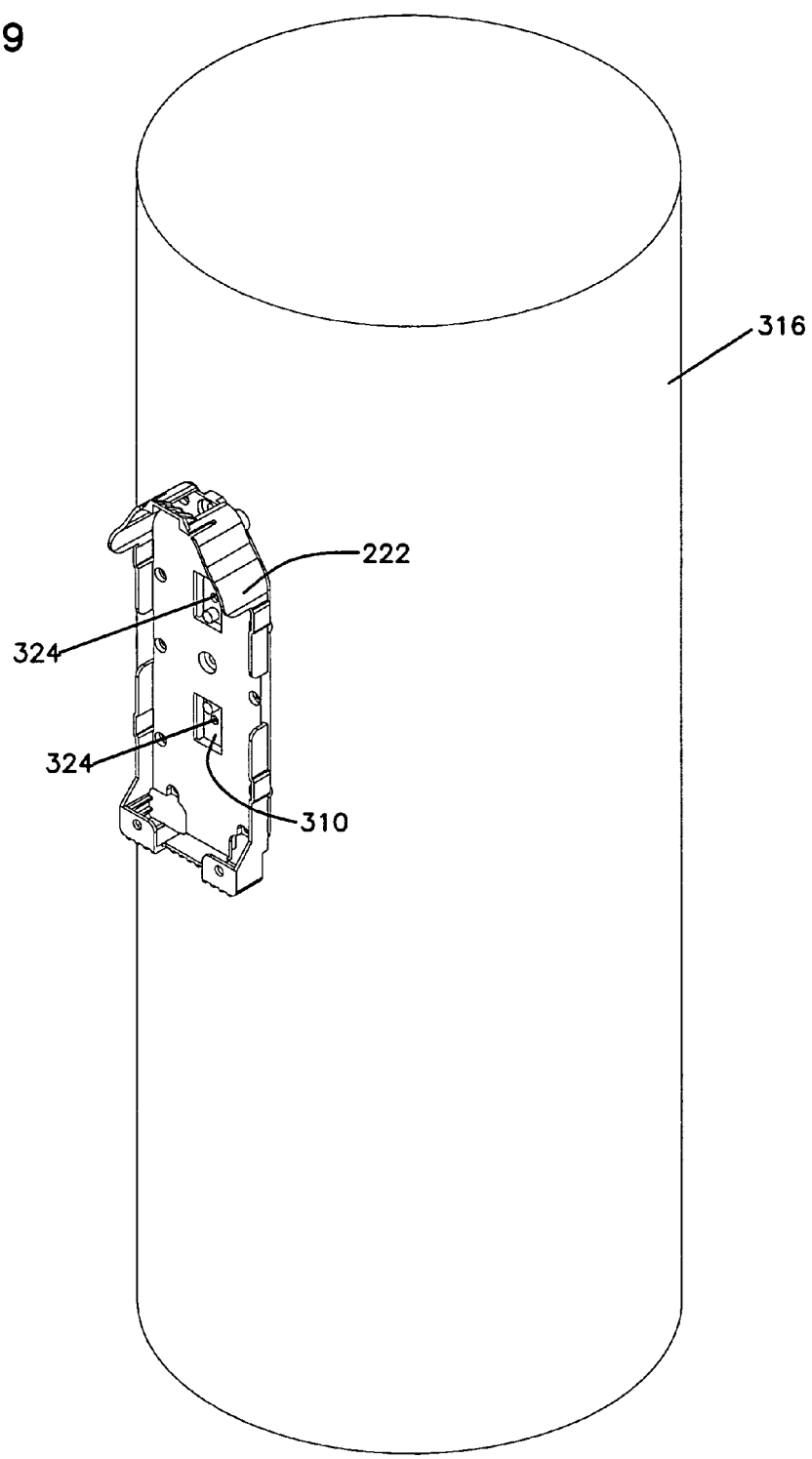
FIG. 9 shows the universal bracket of the system of FIGS. 2 and 3 mounted to a post.
Figure 10:
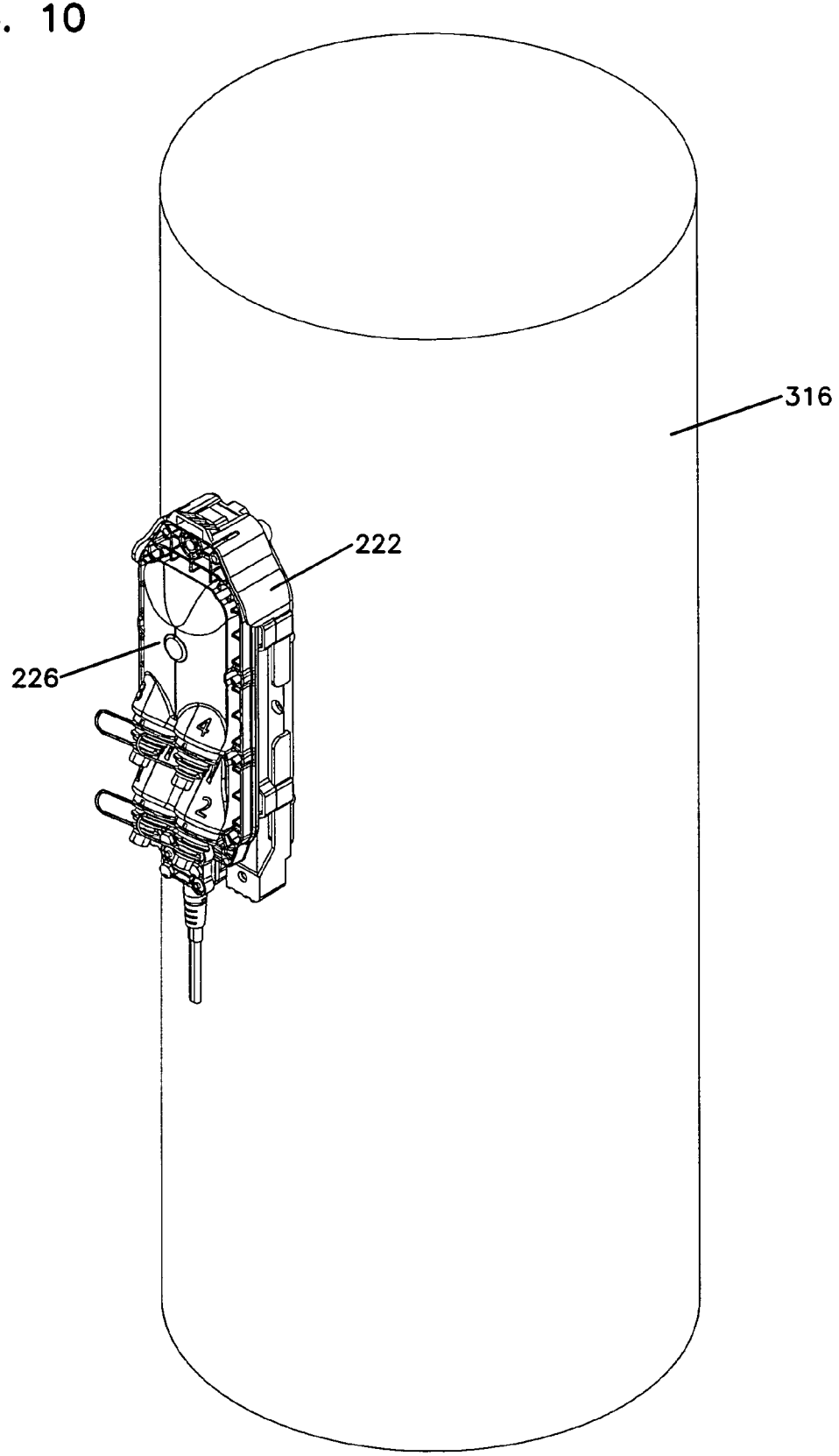
FIG. 10 shows the drop terminal mounted in the universal bracket of FIG. 9.
Figure 13:
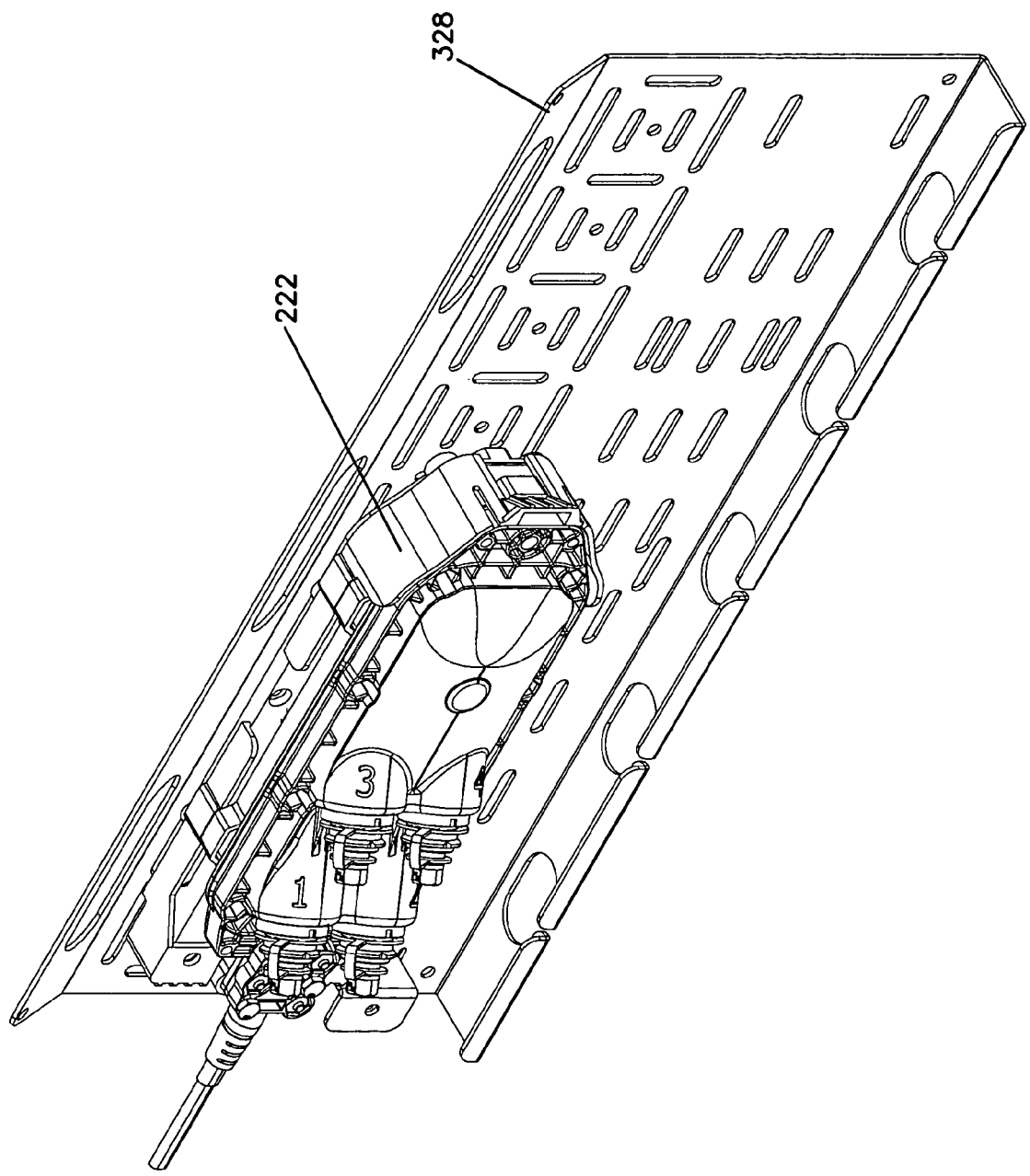
FIGS. 13 and 14 show the drop terminal mounting system of FIGS. 2 and 3 with the universal bracket mounted to a conventional waffle bracket.
Figure 14:
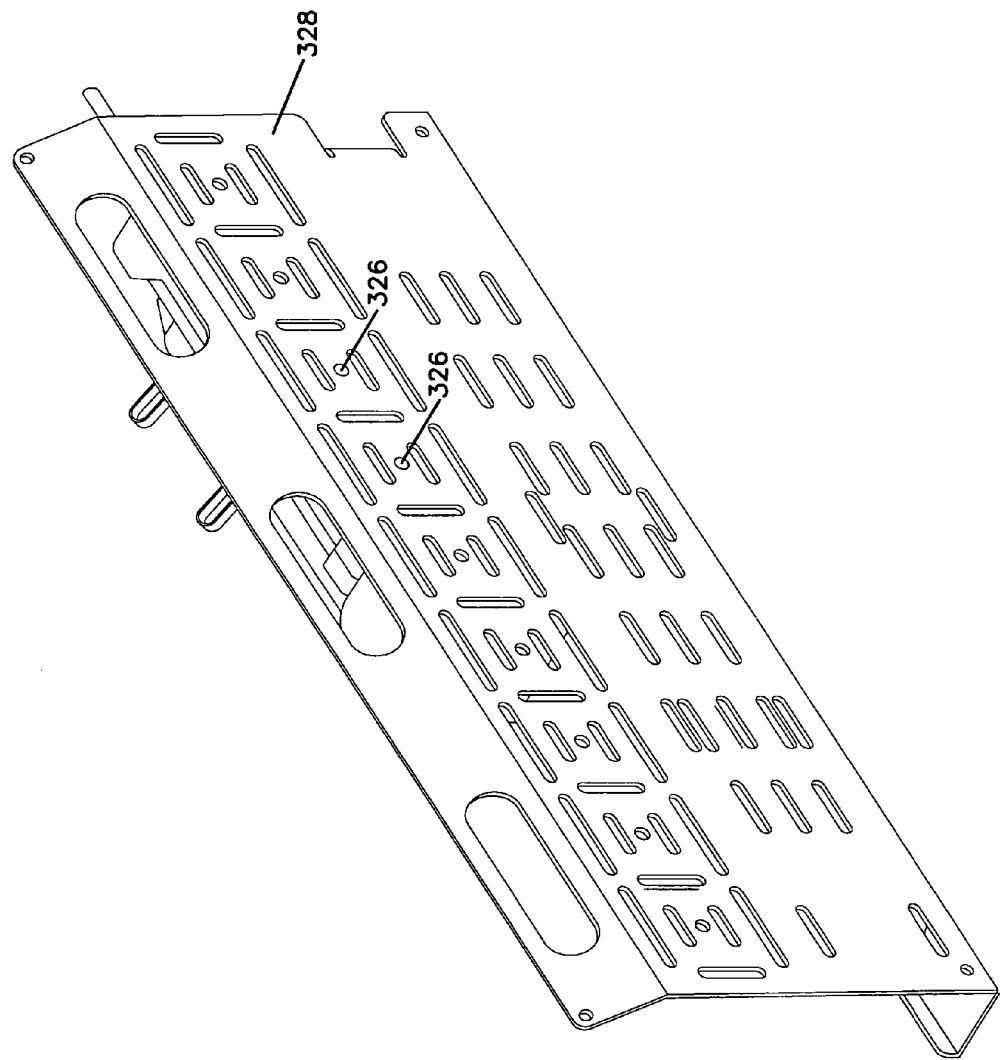

The strap-receiving members 310 also include additional features for use in mounting the universal bracket 222 to poles or other structures. For example, each strap-receiving member 310 includes a first through-hole 318, and a second through-hole 320. The second through-hole 320 includes a reinforcing boss 322. As shown at FIG. 9, fasteners such as screws 324 can be inserted through the through-holes 318 and driven into a pole 316 to secure the universal bracket 322 to the pole 316. The recessed nature of the receiving members 310 allows heads of the screws 324 to be recessed relative to the front side 262 of the base portion 260. The through-holes 320 allow the universal bracket 322 to be readily connected to a legacy bracket such as a waffle bracket. For example, shown at FIGS. 13 and 14, self tapping screws 326 are inserted through openings in a waffle bracket 328 and threaded into the reinforcing bosses 322 of the through-holes 320 to secure the universal bracket 322 to the waffle bracket 328. In certain embodiments, the through-holes 320 can align with bosses provided on the housing of the drop terminal 226. In this way, by using longer self tapping screws, the screws can also be threaded through the reinforcing boss 322 and into the boss of the drop terminal to provide a more secure connection. This type of connection also provides additional means for retaining the drop terminal 226 within the cradle 224.

Referring again to FIGS. 4 and 6, the universal bracket 222 further includes two enlarged through-holes 340 that are positioned generally along a center line of the universal bracket 222. The enlarged through-holes 340 have enlarged diameters as compared to the through-holes 300 and are adapted to receiving larger fasteners such a lag bolts. The enlarged through-holes 340 also include countersunk recesses 342 for receiving the heads of fasteners inserted through the through-holes 340. Fasteners inserted through the through-holes 340 can be used to secure the universal bracket 222 to a structure such as a pole.

For certain applications, an installer may want to use a securement technique that uses both a universal bracket 222 and the securement features provided on the drop terminal 226. To accommodate this possibility, the universal bracket 222 includes through-holes that align with the through-holes 248 and 250 of the drop terminal 226. For example, one of the enlarged through-holes 340 of the universal bracket 222 aligns with the through-hole 250 of the drop terminal 226. Also, the retention tabs 290 define through-holes 360 that align with the through-holes 250 of the drop terminal 226. The base portion 260 is notched beneath the retention tabs 290 (e.g., see notches 291 shown at FIG. 7) to provide clearance for running fasteners through the retention tabs 290 without interference from the base portion 260. The alignment of the through-holes between the drop terminal and the universal bracket 222 allows an installer to insert fasteners through both the drop terminal 226 and the universal bracket 222 and into a structure to which it is desired to mount the drop terminal. In this type of configuration, the fasteners provide secondary retention of the drop terminal within the universal bracket 222.

Referring back to FIG. 4, the side walls 278, 280 also define a pair of through-channels 370 that extend outwardly from the front side 262 of the base portion 260. The channels 370 align with the slots 355 defined by the side ears 254 of the drop terminal 226 (see FIG. 3). In this way, ties can be looped through the channels 370 and also through the slots 255 of the side ears 254 to provide secondary retention of the drop terminal 226 in the cradle 224. The channels 370 can also be positioned to receive the fingers 285 of a legacy hanger bracket 286 (see FIG. 15) to secure the cradle 224 to the hanger bracket 286.

Figure 18:
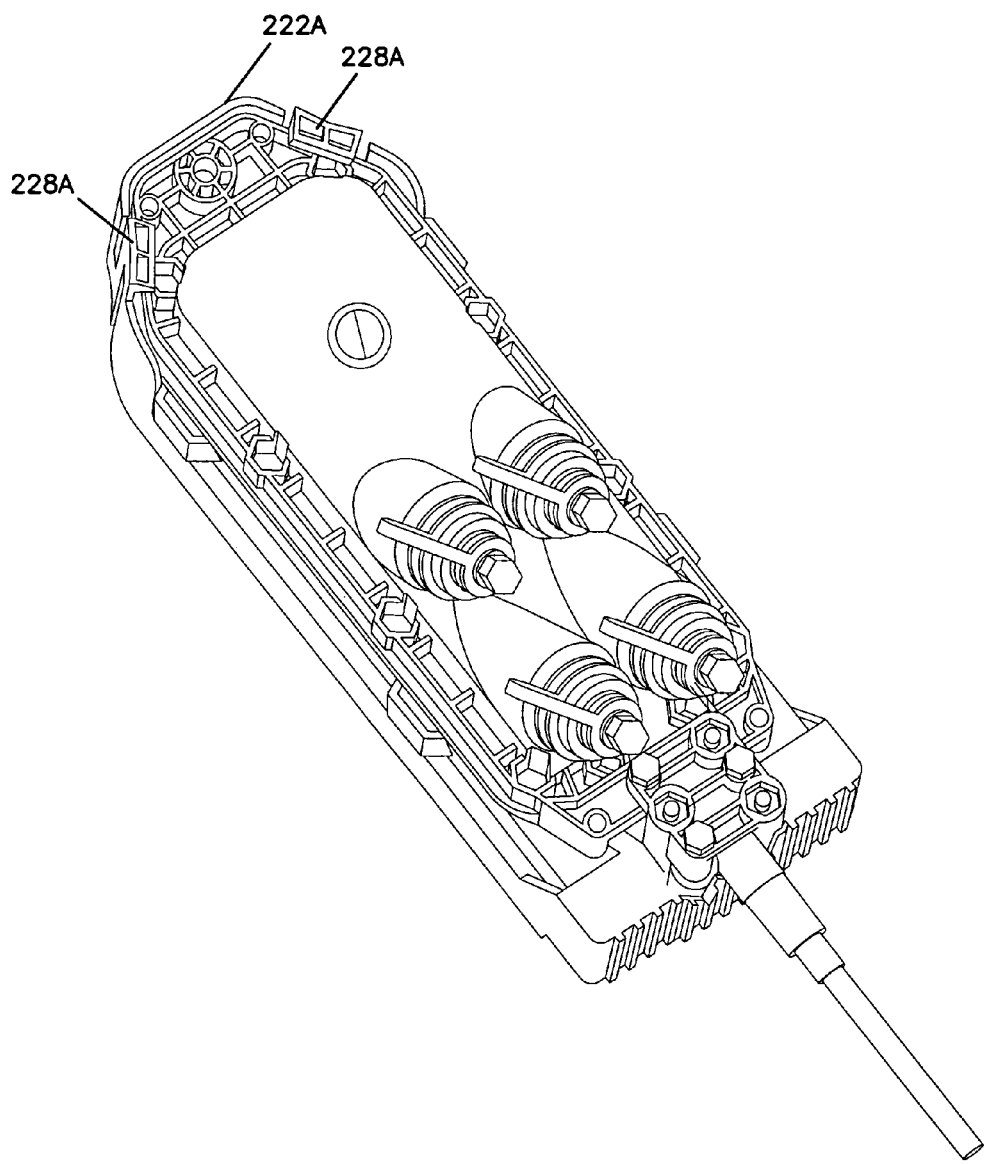
FIG. 18 shows a second drop terminal mounting system in accordance with the principles of the present disclosure, the mounting system has a universal bracket with an alternative latching arrangement.
Figure 19:
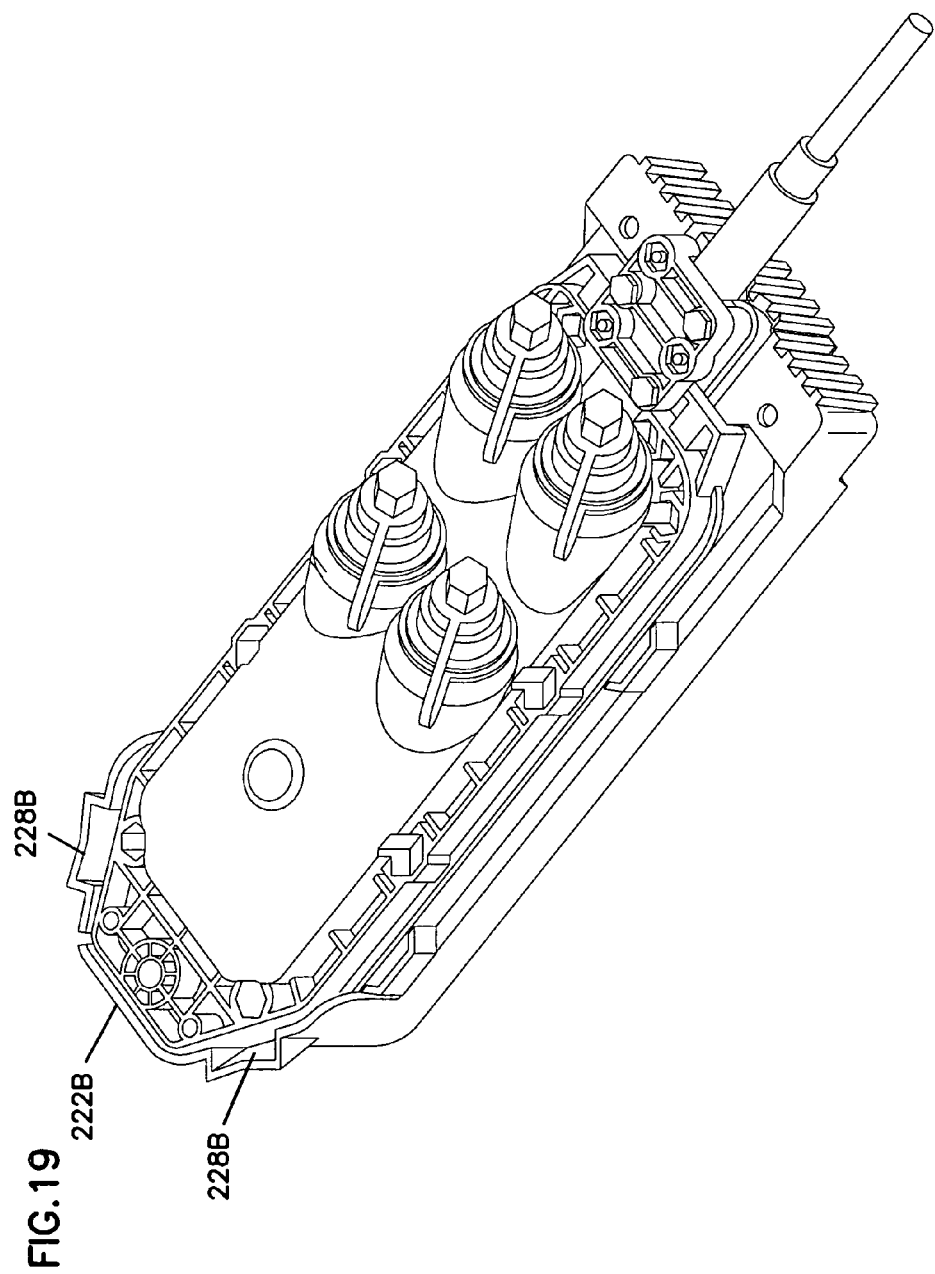
FIG. 19 shows a third drop terminal mounting system in accordance with the principles of the present disclosure, the system includes a universal bracket having still another latching configuration.
Figure 20:
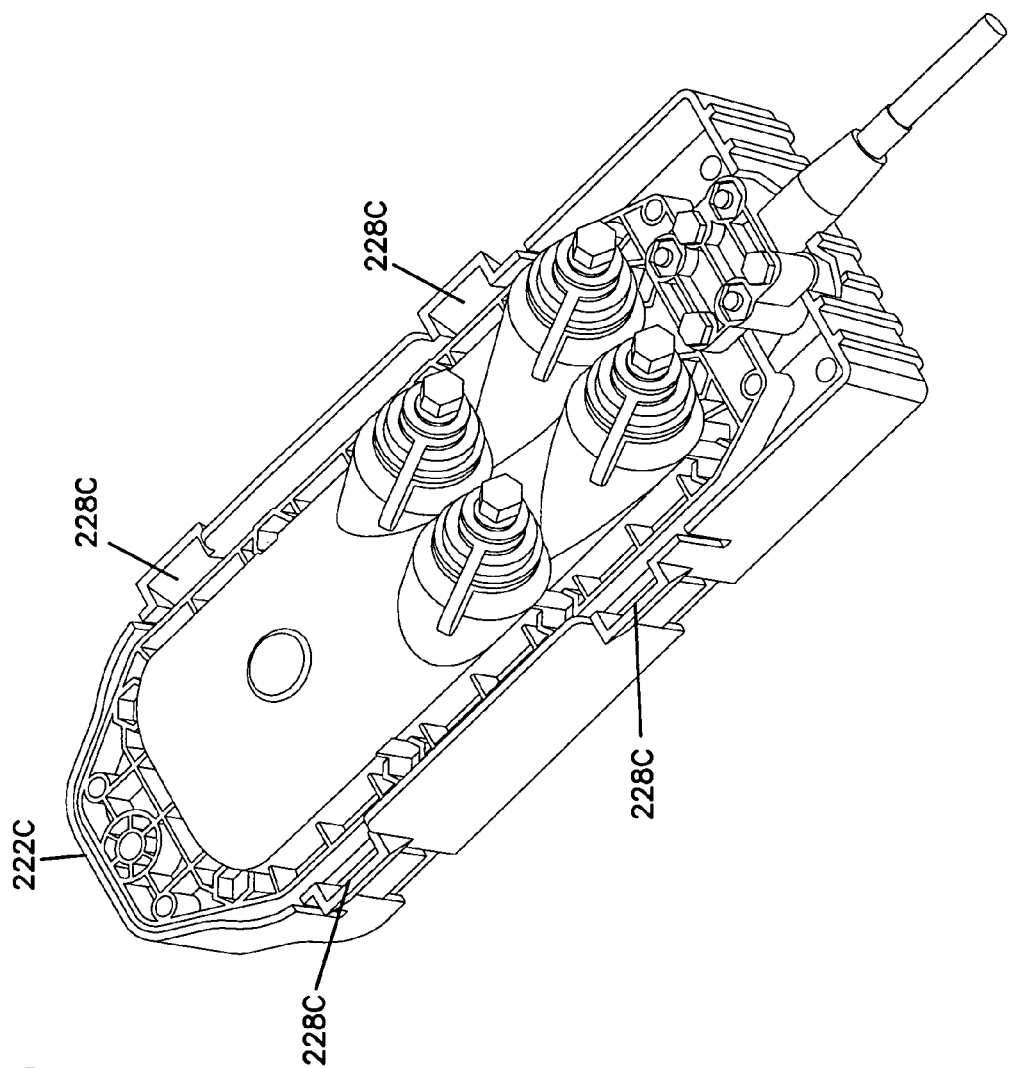
FIG. 20 shows a fourth drop terminal mounting system in accordance with the principles of the present disclosure, the drop terminal mounting system has a universal bracket with still another latching system.

FIGS. 18-20 show alternative universal brackets 222A, 222B, 222C having inventive features in accordance with the principles of the present disclosure. Bracket 222A has been modified to include two resilient latches 228A that snap over the front side of the drop terminal 226 when the drop terminal is mounted within the bracket. The universal bracket 222B has been modified to include two resilient latches 228B that snap over side ears 254 of the drop terminal 226 when the drop terminal is mounted within the bracket 222B. The universal bracket 222C has been modified to include four resilient latches 228C that snap over the side ears 254 of the drop terminal 226 when the drop terminal is mounted within the universal bracket 222C.

While it is preferred to use the snap-fit configuration to secure the drop terminal within the cradle, it will be appreciated that other securement arrangements can also be used. For example, fasteners such as screws, straps, ties or other structures could also be used to secure the drop terminal within the cradle of the universal bracket.

From the forgoing detailed description, it will be evident that modifications and variations can be made in the devices of the disclosure without departing from the spirit or scope of the invention.

We claim:

1. A drop terminal mounting system comprising:
    a drop terminal including:
        a drop terminal housing having a cover mounted to a base, wherein the cover and the base cooperatively define an interior;
        a plurality of fiber optic adapters mounted to the drop terminal housing, the fiber optic adapters having exterior ports that are accessible from an exterior of the drop terminal housing;
    a bracket including a cradle for receiving the drop terminal, wherein the bracket includes a base portion having a front side and a back side, wherein the cradle of the bracket is located at the front side of the base portion, wherein the bracket is elongated along a length that extends from a first end to a second end of the bracket, wherein the cradle is defined by a wall structure including a first end wall that extends outwardly from the front side of the base portion and is located at the first end of the bracket, a second end wall that projects outwardly from the front side of the base portion and is located at the second end of the bracket, and side walls that project outwardly from the front side of the base portion and extend between the first and second ends of the bracket.

2. The drop terminal mounting system of claim 1, wherein the drop terminal is retained in the cradle by a snap-fit connection.

3. The drop terminal mounting system of claim 2, wherein the snap-fit connection is provided by a single resilient latch.

4. The drop terminal mounting system of claim 3, wherein the bracket is elongated along a length that extends between a first end and a second end of the bracket, wherein the drop terminal housing is elongated along a length that extends between a first end and a second end of the drop terminal housing, wherein the bracket defines a pocket at the first end of the bracket and the single resilient latch is located at the second end of the bracket, and wherein when the drop terminal housing is positioned within the cradle of the bracket, the first end of the drop terminal housing is retained within the pocket of the bracket and the second end of the drop terminal housing is retained by the single resilient latch.

5. The drop terminal mounting system of claim 1, wherein the bracket has a one-piece plastic construction.

6. The drop terminal mounting system of claim 1, wherein the bracket includes strap receivers and also includes through-holes for receiving fasteners.

7. The drop terminal mounting system of claim 1, wherein the base portion defines through-openings that extend between the front and back sides of the base portion for receiving fasteners.

8. The drop terminal mounting system of claim 7, wherein at least some of the through-openings are arranged about a periphery of the base portion.

9. The drop terminal mounting system of claim 8, wherein at least some of the through-openings are aligned along a centerline of the bracket.

10. The drop terminal mounting system of claim 1, wherein the bracket includes at least one strap receiver for receiving a strap at the back side of the base portion.

11. The drop terminal mounting system of claim 10, wherein the strap receiver includes a strap-receiving member defining a slot for receiving a strap, and wherein the strap-receiving member also defines at least one though opening for receiving a fastener.

12. The drop terminal mounting system of claim 11, wherein the bracket includes a reinforcing boss aligned with the through-opening of the strap-receiving member.

13. The drop terminal mounting system of claim 10, wherein the bracket includes at least two strap receivers aligned along a centerline of the bracket for receiving straps at the back side of the base portion.

14. The drop terminal mounting system of claim 11, wherein the bracket includes at least two strap receivers aligned along a centerline of the bracket for receiving straps at the back side of the base portion.

15. The drop terminal mounting system of claim 1, wherein the side walls define gaps located at a central region of the cradle.

16. The drop terminal mounting system of claim 1, wherein the bracket defines through-openings that align with corresponding through-openings of the drop terminal housing.

17. The drop terminal of claim 1, wherein the bracket includes a retention pocket located at the first end of the bracket and a resilient latch located at the second end of the bracket.

18. A method of using the drop terminal mounting system of claim 1, wherein the bracket is first installed at a given location, and then the drop terminal inserted into the cradle of the bracket after the bracket has been installed at the location.

19. The drop terminal mounting system of claim 1, wherein the bracket includes means for facilitating mounting the bracket to a pole, a strand and a hand hole rim.

20. A drop terminal mounting system comprising:
a drop terminal including:
a drop terminal housing having a cover and a base, wherein the cover and the base cooperatively define an interior of the drop terminal housing;
a plurality of fiber optic adapters mounted to the drop terminal housing, the fiber optic adapters having exterior ports that are accessible from an exterior of the drop terminal housing;
a bracket including a cradle for receiving the drop terminal, wherein the bracket includes a retention pocket located at a first end of the bracket and a resilient latch located at a second end of the bracket.

21. A method for installing a drop terminal mounting system comprising the steps of:
mounting a bracket having a cradle to a mounting surface, wherein the bracket includes a retention pocket located at a first end of the bracket and a resilient latch located at an oppositely disposed second end of the bracket;
inserting a first end of a drop terminal into the retention pocket of the bracket, wherein the drop terminal includes a drop terminal housing having a base and a cover;
pivoting the drop terminal toward the bracket; and
engaging the resilient latch of the bracket to a second end of the drop terminal.

\* \* \* \* \*

UNITED STATES PATENT AND TRADEMARK OFFICE
CERTIFICATE OF CORRECTION

| | | |
|---|---|---|
| PATENT NO. | : 7,477,824 B2 | Page 1 of 1 |
| APPLICATION NO. | : 11/399715 | |
| DATED | : January 13, 2009 | |
| INVENTOR(S) | : Reagan et al. | |

It is certified that error appears in the above-identified patent and that said Letters Patent is hereby corrected as shown below:

In the Claims

Col. 8, lines 49-52, claim 14: "14. The drop terminal mounting system of claim 11, wherein the bracket includes at least two strap receivers aligned along a centerline of the bracket for receiving straps at the back side of the base portion." should read --14. The drop terminal mounting system of claim 1, wherein the side walls define through-channels that extend outwardly from the front side of the base portion.--

Signed and Sealed this
Sixteenth Day of December, 2014

Michelle K. Lee
*Deputy Director of the United States Patent and Trademark Office*